United States Patent [19]

Stikeleather et al.

[11] Patent Number: 4,880,387
[45] Date of Patent: Nov. 14, 1989

[54] CONNECTOR FOR FLEXIBLE ELECTRICAL CONDUIT

[75] Inventors: Allan Stikeleather, Canton; Geoffrey Blake, Boston, both of Mass.

[73] Assignee: IBC Corporation, South Easton, Mass.

[21] Appl. No.: 251,798

[22] Filed: Oct. 3, 1988

[51] Int. Cl.[4] .............................................. H01R 4/66
[52] U.S. Cl. .................................... 439/98; 174/65 R
[58] Field of Search ................. 174/65 R; 439/95, 96, 439/98, 100, 101

[56] References Cited

U.S. PATENT DOCUMENTS 3,847,417 11/1974 Bawa ............................ 174/65 R X
3,858,151 12/1974 Paskert ................................ 339/14 R
4,012,578 3/1977 Moran et al. ......................... 174/51

Primary Examiner—Eugene F. Desmond
Attorney, Agent, or Firm—Kenway & Crowley

[57] ABSTRACT

A connector for joining flexible electrical conduit to a housing such as a junction box, fixture or the like which is formed cylindrically from light metal and includes relatively flexible arms depending from a relatively stiff face portion, retaining members flaring from and extending for a substantial portion of the length of the flexible arms. Multiple barbs are formed on the flexible arms to engage the conduit and flanges are formed at the extremity of the flexible arms to coopperate with the retaining members to clamp the connector to the housing.

2 Claims, 2 Drawing Sheets

CONNECTOR FOR FLEXIBLE ELECTRICAL CONDUIT

BACKGROUND OF THE INVENTION

The present invention relates to a connector by which helically grooved electrical conduit can be rigidly secured in a housing such as a junction box, fixture or the like.

The problem of securely fastening flexible electrical conduit in a junction box has been solved in several ways in the past. One such solution involves die cast sleeves which are threaded into the junction box and then secured by a locking nut. Conduit is then fed through the sleeves and clamped by screw-tightening a bar assembly to bear upon the inserted conduit. While this method serves the ultimate purpose of holding the electrical conduit in the junction box, it has several drawbacks.

Connectors involving die cast sleeve assemblies typically have several separate subparts which are manufactured and then loosely assembled and sold as a connector unit. Individual assembled units must then be disassembled for installation at the worksite. Such a complicated manufacturing and installation technique is very expensive and time-consuming. Also, junction boxes of the type in which the connector of the present invention are designed for use are often located in out-of-the-way places to which access is limited. Die cast sleeve assemblies have proven difficult to use where needed because the numerous small parts require ample space and a dexterous hand to assemble and position in the junction box. Finally, die cast assemblies by their very nature tend to be somewhat weighty and costly.

Various lightweight and relatively inexpensive devices have been proposed as connectors to supplant die cast sleeve assemblies and thus solve the problem at hand. These are referred to as clips and two such clip designs are found in U.S. Pat. Nos. 3,858,151 and 4,012,578 respectively. These patents disclose clips having body portions of various cross-sections to enclose and improve the holding action on conduit to provide good electrical conductivity between the conduit and the junction box. Clip devices of the kind patented, however, have been less than satisfactory because they do not hold the flexible electrical conduit in place as securely as required. In U.S. Pat. No. 3,858,151, for example, a clip is described which has a "tubular body portion" only a pair of barbs which engage the helical groove of the electrical conduit. These barbs, however, are so few and located so closely together that they engage the conduit along only a relatively short portion of its axial length. As a result, the conduit tends to pull loose from the junction box by becoming unscrewed.

In U.S. Pat. No. 4,012,578, a connector clip is described which has a "body portion generally defined by flat walls". The body portion rather than being cylindrical as in the patent discussed above has a triangular, square, pentagonal or hexagonal cross-section, the flat walls assertedly better engaging the conduit outer surface. In practice, however, the patented device fails to engage the conduit evenly and the conductor is only loosely connected to the junction box, remaining subject to unwanted disengagement.

Accordingly, an object of the present invention is an improved mechanical and electrical connection of a conduit to a junction box or the like.

It is another object of the present invention to provide an easily manufactured connector of a one-piece construction.

It is still another object of the present invention to provide a connector which requires no prior assembly and which can be easily and inexpensively installed.

A further object of the invention is to reduce the cost and complexity of connectors by stamping them from relatively light metal.

SUMMARY OF THE INVENTION

The present invention involves a one-piece connector for flexible helically-grooved conduit which is easily manufactured and installed. The connector of the present invention may be stamped and formed from sheet metal and shaped for accepting electrical conduit and securely holding it in a junction box. The connector also provides good electrical connection between the junction box and the outer surface of the conduit when that surface is conductive.

In a typical installation, the connector is threaded onto an end of a section of electrical conduit having a helically grooved outer surface or sheath. The connector is formed with a relatively stiff flat face portion from which opposed relatively flexible arms depend. Multiple barbs on the arms engage the groove of the conduit sheath over a relatively lengthy broad area. The multiple barbs not only engage the conduit over a considerable length but are oriented to maximize gripping power. Each of the arms also includes a radially outwardly extending retaining member spaced from a similarly extending flange.

Further, the flexible arms are arcuately shaped to embrace the electrical conduit with which the connector is used. Also, the flexible arms normally flare outwardly and are designed to be forced inwardly when inserted to contribute additional grasping power. The use of multiple barbs as noted on the arcuately-shaped resilient arms which embrace the conduit when the connector is threaded onto an end of a section further aid to securely affix the connector to the conduit. Once the connector is in place on the conduit, the combination is ready for easy insertion in a junction box with the accompanying gain in grasping power. This action occurs because the diameter of the circle which is defined by the opposed flared flexible arms is slightly larger than that of the opening in the junction box wall in which it is inserted. When the connector is actually inserted into the opening, the opposed arms are bent inwardly and squeezed together with the barbs contacting the outer surface of the electrical conduit. A firm mechanical connection between the conduit, the connector, and the junction box is thus established when the insertion is made into a junction box opening because of the action of the multiple barbs.

Unlike prior art clips which have relatively small openings formed in their face portions which are surrounded by inwardly-facing anti-short flanges, the present invention has a large opening and an anti-short flange which extends into the junction box and aids in the insertion of the wires of the conduit into the connector.

Relatively long retaining members are formed in the flexible arms and normally project slightly radially outwardly. The retaining arms extend from points adjacent to the face portion and when the connected is inserted, the retaining members first are squeezed together and then spring back to their original positions. Thus, the connector is locked in position in the junction box. Flanges formed on the ends of the flexible arms extend outwardly more or less parallel to the junction box walls to prevent the connector from being inserted too far into the junction box. The retaining members and flexible arm flanges combine to clamp the connector, and consequently the attached electrical conduit, to the junction box.

DESCRIPTION OF THE PREFERRED EMBODIMENT

Figure 1:
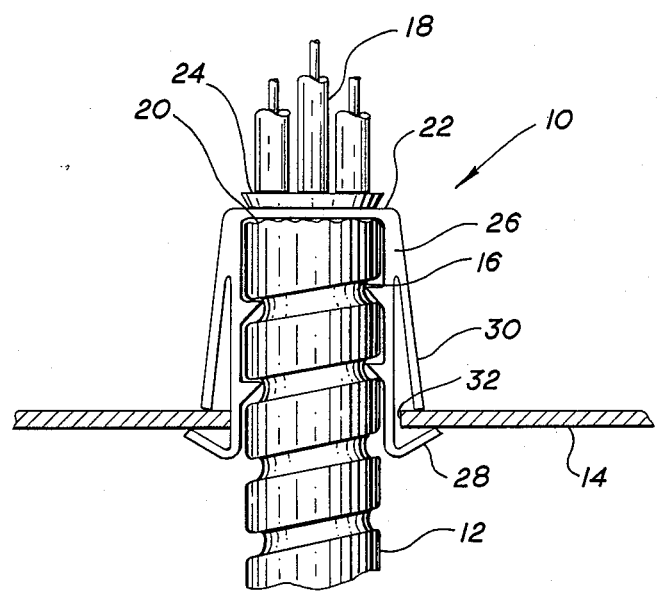
FIG. 1 is a side elevational view of a one-piece flexible conduit connector in accordance with the present invention along with a section of electrical conduit and a junction box.
Figure 2:
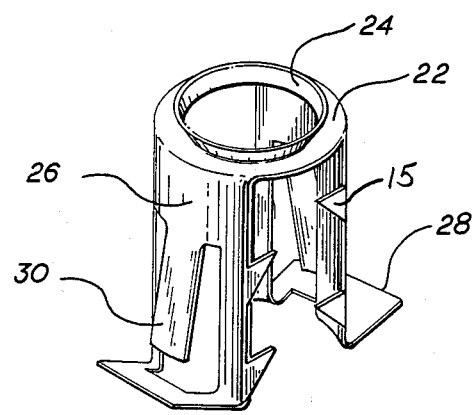
FIG. 2 is a perspective view of the one-piece flexible conduit connector constructed in accordance with the present invention.

The one-piece flexible conduit connector of the present invention is made of a resiliently flexible material formed roughly cylindrically to be threaded onto an end of a piece of helically grooved flexible electrical conduit and then inserted into an opening in a wall of a junction box in order to secure the conduit mechanically in the junction box. The connector has a circular face portion in which there is an opening through which the electrical wires of the conduit can pass and from which an anti-short flange projects axially outward for guiding the electrical wires. Extending axially inward from the outer rim of the face portion (in a direction opposite to the anti-short flange) are a pair of opposed flexible arms for embracing the electrical conduit. Multiple barbs project radially inwardly from the arms to engage the helical groove in the conduit wall to mechanically and electrically connect the conduit to the connector. Flanges and retaining members which comprise a substantial portion of the flexible arms position and clamp the connector to the junction box. The retaining members are relatively long, extending over a considerable portion of the flexible arms.

As shown in the drawing, the connector 10 is threaded onto an end of a helically grooved electrical conduit 12 until the cut end of the sheath 20 abuts the underside of the connector face portion 22. The threading action is guided by barbs 15 which project inward from the flared flexible arms 26. The barbs 15 are designed to engage the helical groove 16 of the conduit sheath 20 at several points and grasp it securely. This action is enhanced as the flared arm 26 encounter the walls of the opening 32 in the junction box during insertion, causing the barbs at the open end of the clip directly in line with the walls to establish a solid electrical contact with the conduit sheath 20. The same gripping action tenaciously resists any pulling or backthreading of the conduit 12 out of the connector 10. Preferably, multiple pairs of barbs 15 are provided to engage several turns of the groove in the outer sheath 20 to ensure that the connector clip is rigidly secured to the conduit 12.

The flexible arms 26 are arcuately shaped to conform generally to the outer profile of the conduit sheath 20 and thereby help to orient the connector 10 properly as it is threaded onto the conduit 12. After the connector 10 has been threaded onto the conduit 12 to the point that the cut end of the wall 20 abuts the undersurface of the face portion 22, the arms 26 serve as an additional stabilizing force for the conduit 12.

For proper installation, the sheath 20 of the electrical conduit 12 is first cut so that the electrical wires 18 within it extend several inches beyond the cut end of the conduit. Thus, when the connector 10 is properly threaded onto the conduit 12, the electrical wires 18 will extend through the large opening formed in the connector face portion 22. For ease of passage of wires extending from the conduit through the opening, an anti-short flange 24 projects upwardly and tapers and turns outwardly somewhat to define an opening slightly larger than the opening formed in the connector face portion 22.

Once the connector 10 is threaded onto the conduit 12, the connector 10 is then inserted into the opening 32 formed in a generally flat wall 14 of the junction box (not shown). The arcuately shaped flexible arms flare outward radially and at a point about midway down their length they partially define a circle having a diameter just slightly larger than that of the opening 32 in the junction box wall 14. As a result, when the connector 10 is inserted through the opening 32, the flexible arms 26 are pinched together and inwardly projecting barbs 15 particularly those at the open end of the clip area caused to engage the outer wall 20 of the conduit 12. This helps to prevent the conduit 12 from later being pulled or backthreaded out of the connector 10 and also enables the flexible arms 26 to offer more stability to the connection by firmly engaging the wall of the opening 32.

Projecting still further radially outwardly from the flexible arms 26 are relatively long retaining members 30 which are designed to be deflected inwardly by the junction box wall 14 as the connector 10 is inserted into the opening 32. The retaining members 30 constitute a substantial part of the arms 26 and when the connector is inserted to the point where the retaining members 30 are entirely within the junction box wall 14, they will spring outwardly to their normal position and thereby prevent the connector 10 from being removed from the junction box. Their length is such that they bend from a point just below the face portion 22.

On the ends of the flexible arms 26 are flanges 28 which project outwardly at an acute angle, preferably between 25° and 45°, to the retainers 30 and have ends extending substantially beyond the junction box wall opening 32. Thus, when the connector 10 is inserted into the junction box wall opening 32, the ends of the flanges 28 contact the outside of the junction box wall 14 to limit the penetration of the connector in the junction box. Further insertion of the connector is possible because the arms 26 and flanges 28 are sufficiently resilient to give slightly. After the retainer members 30 pass entirely into the junction box, they spring outwardly to prevent the connector 10 from disengagement from the junction box. The flanges 28 and the retainers 30 exert a clamping force on the outer wall of the junction box operative to maintain a stable connection between the connector and the junction box. Similarly, the conduit sheath 20 and the connector clip 10 are urged into intimate contact with the result that all three elements are secured together in good electrical contact and mechanical union with one another.

This invention may be embodied in other specific forms without departing from the spirit or essential characteristics thereof. The embodiment described is therefore to be considered in all respects as illustrative and not restrictive, the breadth of the invention being determined by the spirit and scope of the appended claims.

What is claimed is:

1. A one-piece, flexible conduit connector for connecting an electrical conduit having a helically grooved outer metal sheath and electrical wires within said sheath, to an electrical junction box having an opening formed in a wall thereof, said connector including:

a circular face portion having a round opening formed therethrough;

an anti-short flange surrounding said opening and projecting a predetermined distance outward from a front surface of said face portion and tapered away from said opening, said front side of said face portion facing into said junction box;

a pair of flexible arms depending from and flaring away from a rear surface of said face portion, said arms being opposite to each other around the circumference of said face portion and arcuately shaped to conform to said conduit;

a plurality of barbs formed on said flexible arms and positioned to engage said helical groove over a plurality of turns of said groove when said electrical conduit is screwed into said connector, said barbs having pointed ends engaging the surface of said grooves so as to place said metal sheath and junction box in good electrical contact with each other and to prevent said conduit from being either pulled from or backthreaded out of said connector;

a flange extending outwardly from an end of each flexible arm at angle to said flexible arm so as to abut against the outer surface of said junction box wall and limit the insertion of said connector in said junction box wall opening; and a retaining member normally projecting out from each flexible arm, each retaining member being deflectable inwardly to allow said connector to be inserted into said junction box wall opening and springing outwardly to its normal position once said connector has been inserted in said junction box wall, thereby clamping said connector and conduit in place.

2. In a connector for securing a helically grooved flexible conduit containing wires to a junction box having a first opening formed therein, the combination of a one-piece clip of resilient construction having a face portion having a second opening formed therein and an anti-short flange surrounding said second opening, opposed flaring flexible arms being formed on said clip as a part of said resilient construction, said arms being squeezed together by the walls of said first opening upon insertion therein, flanges being formed at the ends of said flexible arms, each such flange extending outwardly from its associated flexible arm at an angle between 25° and 40° to said arm, retaining members normally extending radially outwardly from said flexible arms from points adjacent said face portion, a plurality of pointed barbs being formed on said flexible arms, said bars engaging said flexible conduit upon placement of said connector on said conduit and said wires passing through said first opening and said flange upon insertion of said clip in said first opening, said retaining members cooperating with said flanges to clamp said connector to said junction box upon insertion of said connector therein, whereby good electrical conductivity and mechanical union between said conduit and said junction box is established by said connector upon assembly therewith.

* * * * *